Nov. 7, 1961  M. LEVECQUE ET AL  3,007,813
MANUFACTURE OF NOVEL GLASS ARTICLES
Filed May 2, 1957
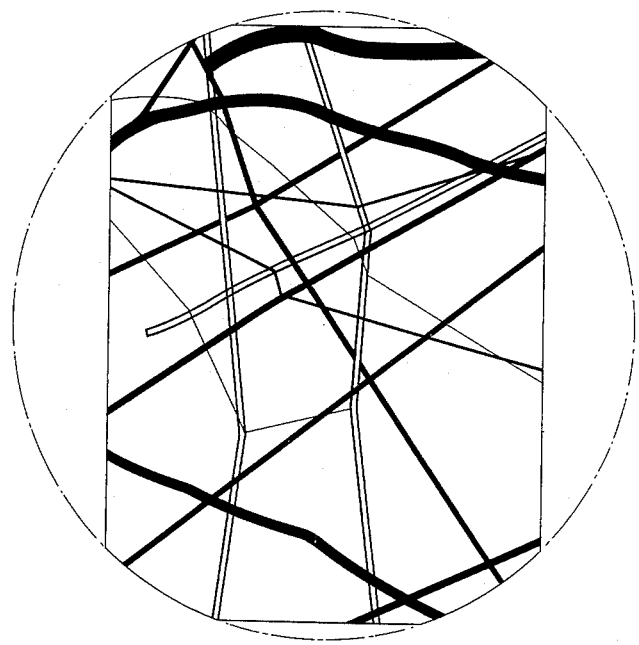
INVENTORS
HENRI BRION
MARCEL LEVECQUE
BY
ATTORNEYS

United States Patent Office 3,007,813
Patented Nov. 7, 1961

3,007,813
MANUFACTURE OF NOVEL GLASS ARTICLES

Marcel Levecque, Saint-Gratien, and Henri Brion, Livry-Gargan, France, assignors to Compagnie de Saint-Gobain, Paris, France
Filed May 2, 1957, Ser. No. 656,510
Claims priority, application France May 11, 1956
5 Claims. (Cl. 117—126)

Patent application Ser. No. 649,109, filed March 28, 1957, by the same inventors concerns the manufacture of sheets, plates, or shaped pieces of glass fibers or similar agglomerated thermoplastic materials, interlaced and bound together in such a way as to make a coherent product. It has notably for an object to make novel products composed of a mixture of at least two different categories of fibers, formed of the same material, but with different thermoplastic properties, some having a notably lower softening point than the others, and to agglomerate them by autogenous action so that they are coherent at their points of contact.

That invention involves glass objects having felted structure, the following composition:

|  | Percent |
|---|---|
| $SiO_2$ | 57 to 64 |
| $Al_2O_3$ | 2 to 5 |
| $B_2O_3$ | 2 to 12 |
| CaO, MgO, BaO | 12 to 15 |
| $Na_2O$, $K_2O$ | 12 to 15 |
| F | 0 to 5 | and fibers in a plurality of sizes corresponding to the formula: sizes as fine as $d/2$, of which 20% approximates a minimum, sizes greater than $2d$, of which 10% approximates a maximum, in which $d$ corresponds to the diameter of the fibers existing in the mixture in a maximum proportion.

In its broad form the related invention includes the method of making felted fibrous glass bodies that comprises mixing glass fibers having materially different thermoplastic properties, subjecting them to heat circa 400–700° C. until they join at points of contact, and ending the heating before they are stabilized.

The fibers may be put under pressure while at self-bonding temperature.

The present application has for an object to make novel sheets, plates, or shaped pieces using the skeleton provided by said application, by impregnation with an organic binding material, notably a thermohardening or thermoplastic resin.

The agglomeration, self-welding, of the fibers by autogeneous action can be slight, merely sufficient to assure the cohesion and form of the product prior to the incorporation of the binding material, and preliminary to the polymerization of the resin, when the binder is unpolymerized resin, but of sufficient degree to assure maintenance of form after wear or deterioration of the binder.

These products can have considerable density, for example, of the order of 400 to 800 kg./m.$^3$, with a high mechanical strength, this density being a function of the quantity of resin used to impregnate the fibers.

The resin can be applied by any convenient method, notably by pulverization and by impregnation, so as to obtain homogeneous distribution of the binder throughout the mass of fibers.

The figure of the drawing is a representation of a photo-micrograph taken through the skeleton of a body made according to this invention, before the impregnation with plastic. Because of the extreme fineness of the lines the draftsman has considered it impractical to show the plastic, as applied in the preferred forms of the invention, wherein its weight is only 5 to 20% of the weight of the glass. The drawing shows several distinct sizes of fiber all of which were less than 30 microns in size but, while the composition of the product conformed to that set forth in the specification, the percentage composition of the product is not necessarily represented in the field of the microscope.

Examples

To put the invention in operation, any thermoplastic resins may be used, such as the polyvinyls; or any thermohardening resins, such as the phenolic resins, the melamines, the polystyrenes, the polyesters, the epoxy resins; or a mixture of these resins. The chemical and physical properties to be conferred on the products may be varied by selection of resins of appropriate quality. Similarly, materials such as gums, starch, or gelatin can be utilized. The applicant has obtained particularly good results with the phenol-formaldehyde resins of which Bakelite is an example.

The impregnation may be carried out with the monomer, or with a resin not completely polymerized. After impregnation, the sheets, plates, or shaped pieces are heat treated or otherwise polymerized to set the resin. The usual polymerizing techniques appropriate to each resin are useful.

The proportion of resin may vary within very large limits. Technically interesting products are obtained which have good mechanical strength by impregnating the glass fibers with a weight of resin about .5 to 20% of the weight of the glass.

Products having good mechanical strength and a low density say 60 kg./m.$^3$ can be obtained by an addition of 15% gelatin.

To make denser products, e.g., of 250 kg./m.$^3$, a proportion of 12% Bakelite can be utilized.

To make products of 400 kg./m.$^3$ density a proportion of 10% polyvinyl acetate can be used.

The invention provides similarly for the realization of products of very high density, up to 2000 kg./m.$^3$, with great mechanical strength, the glass body being dense and the proportion of resin added being very small.

It is important to note that for all these products, the binding agent has little importance in maintaining the shape of the sheet or the shaped piece, which is assured by the nature of the skeleton produced by hereabove mentioned patent. In consequence, an eventual deterioration of the binding agent does not cause modification of the form of the product.

Compositions having the skeleton structure of the related case, when impregnated in the manner herein set forth, are superior in flexibility and may be superior in strength to similar impregnated glass fiber bodies made according to the practices of the prior art.

What is claimed is:

1. A new product of manufacture made of mineral thermoplastic fibers, in particular glass fibers, comprising a skeleton formed of at least two different kinds of fibers, self-joined at their points of contact, formed of the same material but having different diameters and different thermoplastic properties, the fibers of the one kind having a diameter inferior to 5 microns and the fibers of the other kind a much larger diameter but inferior to 30 microns, the fibers of said product being not wholly stabilized, said skeleton being impregnated with a plastic.

2. A new product of manufacture made of mineral thermoplastic fibers, comprising a glass skeleton formed of at least two different kinds of fibers of the same material but having different diameters and different thermoplastic properties, the mixture of fibers being self-joined at their points of contact and comprising a percentage of at least 20% of fine fibers of a diameter inferior to the half of the fibers existing in the mixture in a maximum proportion and a percentage equal or inferior to 10% of fibers of a diameter superior to two times the same diameter, the fibers of said skeleton being not wholly stabilized, the skeleton being impregnated with a polymerized resin.

3. A new product of manufacture made of felted mineral thermoplastic fibers self-joined at their points of contact, not wholly stabilized and including at least two different kinds of fibers formed of the same material, but having different thermoplastic properties in that the fibers of one kind have a softening point much inferior to that of the other kind, said skeleton being impregnated with a polymerized resin.

4. A new product of manufacture made of resin and glass comprising a glass skeneton of interlaced fibers self-joined at their points of contact composed of at least two different kinds of fibers formed of the same material but having different softening points, the fibers of one kind having a softening point at least 100° C. inferior to that of the fibers of the other kind, said skeleton being not wholly stabilized and being impregnated with a plastic material, in particular a polymerized resin in an amount about 5–20% of the weight of the glass.

5. A composite glass and plastic body comprising a gelatine-impregnated glass skeleton, composed of interlaced glass fibers self-joined at their points of contact, not wholly stabilized, and formed of the same material, having a range of diameters from less than 5 microns to less than 30 microns, and having materially different softening points, fibers of one size having a softening point at least 100° C. different from those of another size.

References Cited in the file of this patent

UNITED STATES PATENTS

| | | |
|---|---|---|
| 2,382,290 | Callander | Aug. 14, 1945 |
| 2,550,465 | Gorski | Apr. 24, 1951 |
| 2,577,205 | Meyer et al. | Dec. 4, 1951 |
| 2,613,397 | Borkland | Oct. 14, 1952 |